I. E. PARKER.
SAW TOOL.
APPLICATION FILED MAR. 13, 1914.

1,199,918.

Patented Oct. 3, 1916.

Witnesses
DJ MacCarter
Harry M. Test

Inventor
I. E. Parker
By Charles Chandler
Attorneys

UNITED STATES PATENT OFFICE.

ISAAC E. PARKER, OF COOKS, MICHIGAN.

SAW-TOOL.

1,199,918.  Specification of Letters Patent.  Patented Oct. 3, 1916.

Application filed March 13, 1914. Serial No. 824,466.

*To all whom it may concern:*

Be it known that I, ISAAC E. PARKER, a citizen of the United States, residing at Cooks, in the county of Schoolcraft, State of Michigan, have invented certain new and useful Improvements in Saw-Tools; and I do hereby declare the following to be a full, clear, and exact description of the invention, such as will enable others skilled in the art to which it appertains to make and use the same.

This invention relates to improvements in saw tools.

The principal object of the invention is to provide a device with which a saw can be gaged, jointed, and set.

Other objects reside in the peculiar construction, arrangement, and operation of the various parts to accomplish the desired functions.

Other objects and advantages will be apparent from the following description, when taken in connection with the accompanying drawings.

Figure 1:
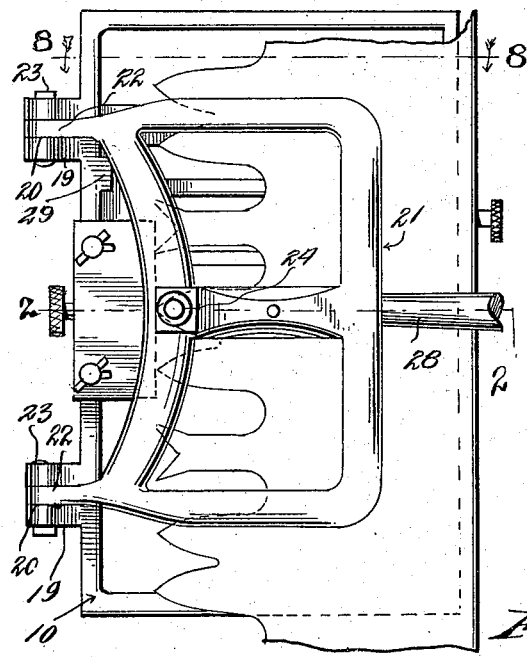
Figure 2:
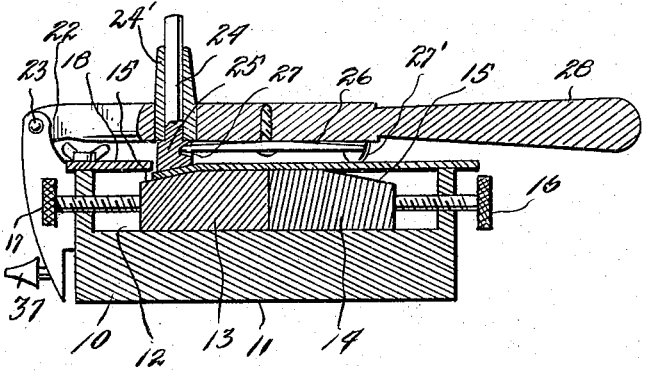

In the drawings: Figure 1 is a top plan showing the device in position to set a tooth of the saw. Fig. 2 is a vertical transverse sectional view on the line 2—2 of Fig. 1.

Referring particularly to the accompanying drawings, 10 represents a rectangular open framework across the center of which extends a member 11 having a channel 12 extending the entire length thereof. Disposed in this channel are the two blocks of wood 13 and 14, the former of which is hard, and the other soft, and both of which are provided with the upper beveled end faces 15. Engaged through the opposite sides of the frame, and extending into the ends of the channel 12 are the set screws 16 and 17, which bear respectively against the opposite ends of the block in the channel before moving the block longitudinally in the channel. Mounted on the side of the frame over the set screw 17, and adjustable transversely of the frame is a plate 18 the inner edge of which forms a guide and stop for the points of the saw teeth to be set. Mounted on the side of the frame on each side of the set screw 17 is a bracket 19, one end of which projects beyond the edge of the side and is bifurcated as at 20. A swinging frame 21 is provided with the apertured ears 22 which are disposed within the bifurcations of the brackets 19 and has the pivot pins 23 passed therethrough. Slidable vertically through the swinging frame in a sleeve bearing 24' is a pin 24 carrying on the lower end thereof a beveled block 25, which is adapted to engage on the upper face of the tooth of the saw disposed over the beveled face 15 of the block 13. On the underside of the frame 21 is a spring 26 which engages in a notch 27 of the block 25 and holds the block normally in elevated position. On the underside of the outer end of the frame 21 are rubber buttons 27'. The saw is laid on the frame so that the point of one of the teeth touches the inner edge of the plate 18. The frame 21 is then swung down onto the saw by means of a handle 28 carried by the frame. The upper projecting end of the pin 24 is given a sharp blow with a hammer. This drives the pin downwardly against the tension of the spring 26 and causes the tooth of the saw to be bent into the proper set.

What is claimed is:

A saw tool comprising an open frame, an adjustable beveled block mounted in the frame, an adjustable gage plate carried by the frame adjacent the beveled block, a frame pivotally mounted on the first frame, a sleeve bearing mounted in the second frame, a setting element comprising a stem slidably mounted in the bearing and having its lower end terminating in a head forming a shoulder engageable with the bearing to limit movement of the stem in one direction, said head being provided with a notch, and a leaf spring mounted on the pivoted frame and having its end engaged with the notch to normally hold the shoulder in engagement with the bearing.

In testimony whereof, I affix my signature, in the presence of two witnesses.

ISAAC E. PARKER.

Witnesses:
 ANTHONY C. MCCAFFERTY,
 BERT CAMPBELL.

*Copies of this patent may be obtained for five cents each, by addressing the "Commissioner of Patents, Washington, D. C."*